(12) United States Patent
Anderson

(10) Patent No.: US 8,486,239 B2
(45) Date of Patent: Jul. 16, 2013

(54) ELECTROLYSIS ANODE

(76) Inventor: Michael Anderson, Milton-Freewater, OR (US)

(*) Notice: Subject to any disclaimer, the term of this patent is extended or adjusted under 35 U.S.C. 154(b) by 463 days.

(21) Appl. No.: 12/850,128

(22) Filed: Aug. 4, 2010

(65) Prior Publication Data

US 2011/0031131 A1 Feb. 10, 2011

Related U.S. Application Data

(60) Provisional application No. 61/232,575, filed on Aug. 10, 2009.

(51) Int. Cl.
*C25B 11/02* (2006.01)
*C25B 9/02* (2006.01)
*C25B 1/04* (2006.01)

(52) U.S. Cl.
USPC ............... 204/286.1; 204/242; 204/275.1; 204/297.01; 205/628; 205/637

(58) Field of Classification Search
USPC ....... 204/242, 275.1, 286.1, 297.01; 205/628, 205/637
See application file for complete search history.

(56) References Cited

U.S. PATENT DOCUMENTS

| | | | |
|---|---|---|---|
| 3,530,051 A | 9/1970 | Ueda et al. | |
| 4,029,566 A | 6/1977 | Brandmair et al. | |
| 4,726,888 A | 2/1988 | McCambridge | |
| 4,865,701 A | 9/1989 | Beck et al. | |
| 5,006,209 A | 4/1991 | Beck et al. | |
| 5,284,562 A | 2/1994 | Beck et al. | |
| 5,632,870 A | 5/1997 | Kucherov | |
| 6,328,875 B1 * | 12/2001 | Zappi et al. | 205/500 |
| 6,689,262 B2 | 2/2004 | Senkiw | |
| 7,052,587 B2 | 5/2006 | Gibson et al. | |
| 7,482,072 B2 | 1/2009 | Brooks et al. | |
| 2008/0164152 A1 | 7/2008 | Sanchez et al. | |
| 2008/0257751 A1 * | 10/2008 | Smola et al. | 205/628 |
| 2008/0277287 A1 * | 11/2008 | Dopp | 205/348 |
| 2009/0038955 A1 * | 2/2009 | Rau | 205/508 |
| 2009/0178931 A1 | 7/2009 | Faita | |
| 2010/0122914 A1 * | 5/2010 | Khodabakhsh | 205/763 |

* cited by examiner

*Primary Examiner* — Nicholas A Smith
(74) *Attorney, Agent, or Firm* — Alleman Hall McCoy Russell & Tuttle LLP

(57) ABSTRACT

Methods systems and devices for impeding an anode from being corroded or dissolved are provided. In one example, an electrolysis system includes an anode, the anode disposed on a support including a housing, the housing having an inverted cup on an end, the anode on an interior wall of the inverted cup such that electrical contact with an electrolysis solution is made along a concave portion of the inverted cup. Such an example may further include a cathode, the cathode disposed within a collection pipe such that gas produced at the cathode is retained within a channel of the collection pipe.

18 Claims, 1 Drawing Sheet

ELECTROLYSIS ANODE

CROSS REFERENCE TO RELATED APPLICATIONS

This application claims the benefit of U.S. Provisional Patent Application No. 61/232,575, filed Aug. 10, 2009 and entitled ELECTROLYSIS ANODE, the entirety of which is hereby incorporated by reference for all purposes.

TECHNICAL FIELD

The present application relates to electrolysis of water solutions, and more particularly, to impeding an anode from being corroded or dissolved during electrolysis.

BACKGROUND AND SUMMARY

During electrolysis of water solutions, water decomposes into diatomic hydrogen and oxygen. However, water solutions may contain solutes and other chemicals that may react with an electrode carrying out electrolysis, such as an anode. Consequently, such an anode may dissolve or corrode, leading to an increase in a draw of amps or watts in the system over time, and thus leading to decreased efficiency of the anode.

The inventor herein recognizes the above problems. Consequently, methods systems and devices for impeding an anode from being corroded or dissolved are provided. In one example, an electrolysis system includes an anode, the anode disposed on a support including a housing, the housing having an inverted cup on an end, the anode on an interior wall of the inverted cup such that electrical contact with an electrolysis solution is made along a concave portion of the inverted cup. Such an example may further include a cathode, the cathode disposed within a collection pipe such that gas produced at the cathode is retained within a channel of the collection pipe.

In a further example, a method includes electrolyzing a water-based electrolysis solution to produce at least one of diatomic gaseous oxygen and oxide ions, trapping the at least one of diatomic gaseous oxygen and oxide ions with an inverted cup, the trapped at least one of diatomic gaseous oxygen and oxide ions forming a shield around an anode, the anode disposed within the inverted cup, and bridging, electrically, the shield, the anode, the electrolysis solution, and a cathode.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Described below is one example of an electrolysis system for impeding corrosion of an anode. Such an electrolysis system may be included in an ionizing anode electrolysis plant. Such a plant may use the pressure generated by a large body of water to pressurize gas, the gas further producing useful work, for example by powering a turbine, providing a source of energetic disequilibrium in a heat pump, and/or using the gas as a fuel.

Figure 1:
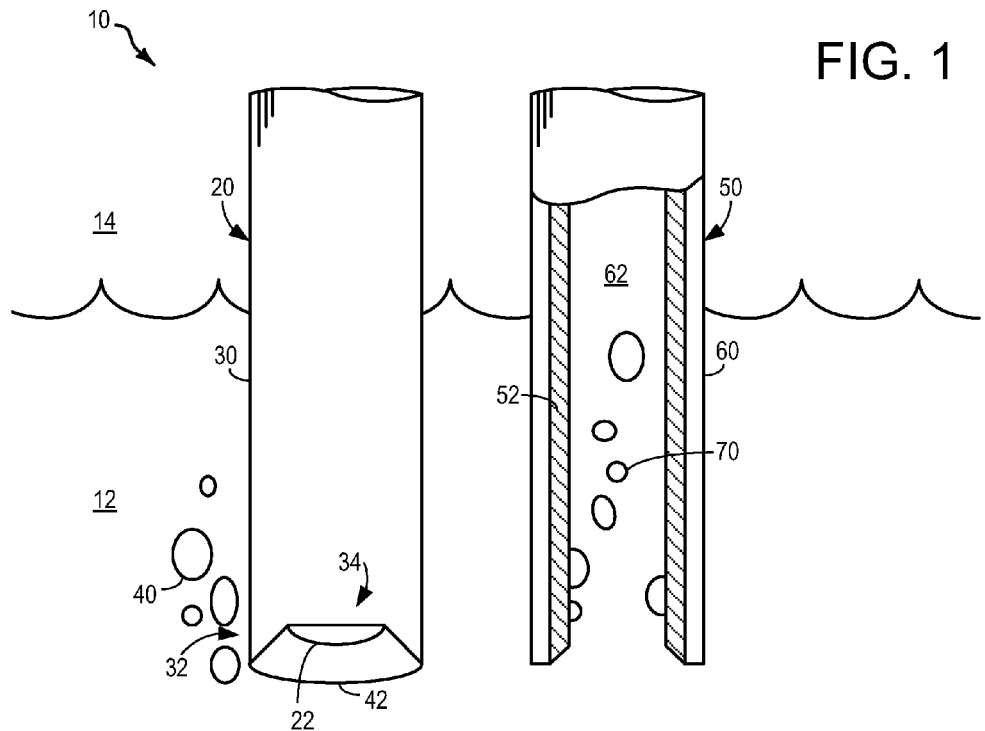
FIG. 1 shows an example electrolysis system.

Turning now to FIG. 1, an example electrolysis system 10 is shown. In the present example, electrolysis system 10 includes an anode support 20 and a collecting pipe 50. In the present example, electrolysis system 10 is one part of an electrical circuit. Anode support 20 includes and anode 22 and collecting pipe 50 includes a cathode 52. Also in the present example, electrolysis system 10 is disposed in an electrolysis solution 12 and may be included in an open electrochemical cell. In further examples, electrolysis system 10 is included in a closed electrochemical cell, the closed electrochemical cell further including a barrier (not shown), which in some examples is a dielectric (one example of which is a plastic plating) and/or membrane, dividing the anode support 20 and the collecting pipe 50 within the electrolysis solution 12. One example of electrolysis solution 12 is an ocean. Further examples of electrolysis solution 12 include underground well water.

Anode support 20 includes a housing 30. Anode housing 30 has an inverted cup 32 on one end. The inverted cup 32 may be integral with the housing 30 and the inverted cup 32 may be separately and coupled to the housing 30. Further, anode 22 is mounted on an interior wall 34 of the inverted cup 32. Anode 22 is one example of an electrode and may be made of a non-reactive or inert material. Examples of anode materials include stainless steel, platinum, and carbon. The surface of anode 22 may include a coating, epoxy, seal or plating to protect anode 22 from corrosion or degradation. In the present example, all of housing 30 includes an electrically insulating material, such a non-conducting plastic or glass. In further examples, only the inverted cup 32 may include such an electrical insulator. The anode 22 is mounted on the interior wall 34 of the inverted cup such that electrical contact with the electrolysis solution 12 is made along a concave portion of the inverted cup 32. As will be discussed below, even in an example where the electrolysis solution 12 is not in direct physical contact with the anode 22, electrical contact is maintained along the interior, concave portion of the inverted cup 32.

Collection pipe 50 includes a housing 60. In one example, collection pipe 50 includes a housing 60 which may further include an electrically insulating material, such as non-conducting plastic or glass. In the present example, housing 60 is a glass tube with interior walls of housing 60 defining a channel 62. In the present example, a cathode 52 lines an interior wall of housing 60. Cathode 52 is one example of an electrode and may be made of a non-reactive or inert material. Examples of cathode materials include copper, stainless steel and platinum. The surface of cathode 52 may include a coating, epoxy, seal or plating to protect cathode 52 from corrosion or degradation. In some examples, the cathode 52 is disposed within channel 62 such that multiple sides of the cathode are exposed, thus increasing the surface area of such an example cathode. In additional examples of collection pipe 50, a plurality of cathodes are used, wired in series or parallel. Collection pipe 50 may further be coupled to an ionizing anode electrolysis plant. Gas produced at cathode 52 may be directed to such a plant under high pressure so that the gas may be used as a fuel source or produce useful work, for example by powering a turbine or providing a source of energetic disequilibrium in a heat pump.

In the present example, anode 22 and cathode 52 are included in an electrical circuit. Anode 22 and cathode 52 may be connected to a voltage source (not shown), so that a potential forms between anode 22 and cathode 52. In one such example, water in electrolysis solution 12 at negatively charged cathode 52 is included in a reduction reaction. In the reduction reaction electrons (e⁻) at cathode 52 are given to hydrogen cations to form hydrogen gas:

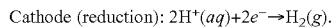

Cathode (reduction): $2H^+(aq)+2e^-\rightarrow H_2(g)$.

Further in such an example, at positively charged anode 22, an oxidation reaction occurs, generating oxygen gas and giving electrons to cathode 52 to complete the circuit:

Anode (oxidation): $2H_2O(l)\rightarrow O_2(g)+4H^+(aq)+4e^-$

In some examples, metal in the electrolysis solution 12 may come out of solution and collect on cathode 52. In the present example, as gas is produced at anode 22, inverted cup 32 causes an oxygen shield 42 to form around the anode 22 by trapping at least a portion of gas. In one example, current travels through anode 22, then oxygen shield 42, then through electrolysis solution 12 and finally, an electrical circuit is completed by cathode 52. Oxygen shield 42 may include oxide ions ($O^{-2}$), as a result of carrying current from the anode 22 to the electrolysis solution 12 and/or from a decomposition of water carried out at an interface between the shield 42 and the electrolysis solution 12. In this way, oxygen shield 42 may be an electrical bridge between the electrolysis solution 12 and the anode 22. Even in an example where the electrolysis solution 12 is not in direct physical contact with the anode 22, electrical contact between anode 22 and electrolysis solution 12 may be maintained along the interior, concave portion of the inverted cup 32 by oxygen shield 42. In this way, anode 22 is impeded from degradation, such as corrosion or being dissolved in electrolysis solution 12. Consequently, anode 22 may maintain a draw of amps or watts in the electrolysis system 10 over time, rather than wearing out more quickly, as may be the case if oxygen shield 42 were not present.

During completion of the electrical circuit described above, gaseous hydrogen and oxygen may be produced. In the present example, diatomic gaseous oxygen bubbles 40 are shown traveling upward and out of electrolysis solution 12 into atmosphere 14. Further, diatomic gaseous hydrogen bubbles 70 produced at cathode 52 are directed upward, through channel 62 within collection pipe 50. In this way, hydrogen bubbles 70 may be collected and used as a fuel source, and/or used to produce useful work, for example by driving a turbine. Additionally, anode support 20 may include a channel similar to channel 62. Such a channel may be used to collect oxygen, which in turn may be used as a fuel or used to produce work, such as by driving a turbine. However, such a channel within anode support 20 may include at least one inverted cup to maintain an oxygen shield 42, protecting one or more anodes within the anode support.

Figure 2:
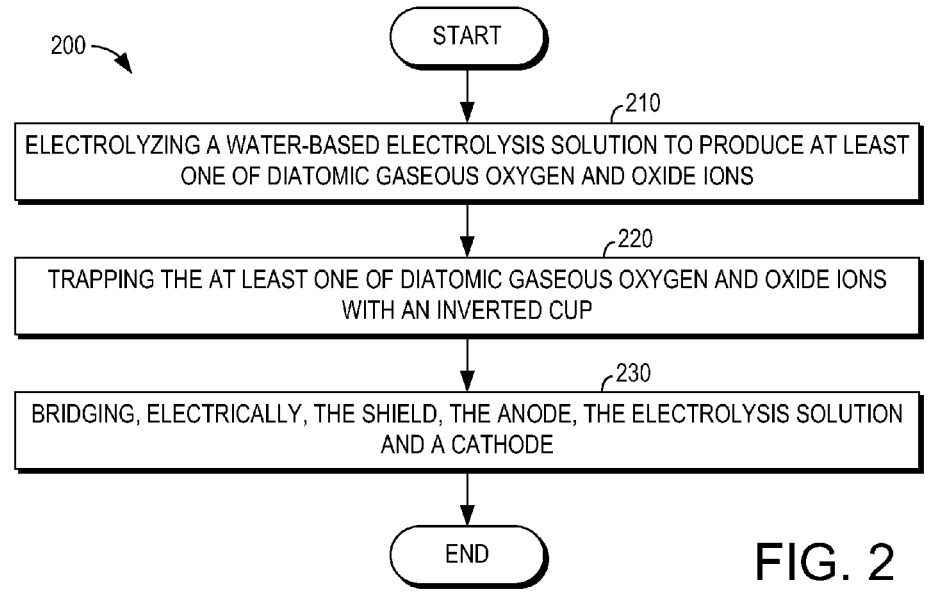
FIG. 2 illustrates an example method for carrying out electrolysis.

FIG. 2 shows and example method 200 for carrying out electrolysis, for example by electrolysis system 10 described above. At 210, the method includes electrolyzing a water-based electrolysis solution to produce at least one of diatomic gaseous oxygen and oxide ions. At 220, the method includes trapping the at least one of diatomic gaseous oxygen and oxide ions with an inverted cup, the trapped at least one of diatomic gaseous oxygen and oxide ions forming a shield around an anode, the anode disposed within the inverted cup. Finally, at 230 the method includes bridging, electrically, the shield, the anode, the electrolysis solution and a cathode. After 230, the method may end. Further examples of method 200 include processes such as collecting hydrogen and/or oxygen gases as fuel and/or to perform useful work. Still further examples of method 200 include processes and determinations such as those described as being carried out by electrolysis system 10 with respect to FIG. 1 above.

It will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An electrolysis system comprising: a first vertically-oriented cathode, the first cathode disposed within a collection pipe such that gas produced at the first cathode is retained within a channel of the collection pipe; and an anode, the anode disposed on a vertically-oriented support including a housing, the housing having an inverted cup on an end, the anode on an interior wall of the inverted cup such that electrical contact with an electrolysis solution is made along a concave portion of the inverted cup, the inverted cup configured to trap at least one of diatomic oxygen and oxide ions decomposed from the electrolysis solution, the at least one of diatomic oxygen and oxide ions forming an oxygen shield around the anode, the oxygen shield configured to prevent corrosion to the anode, and the cathode separated from the anode by the electrolysis solution.

2. The electrolysis system of claim 1, wherein the first cathode is made of a nonreactive material.

3. The electrolysis system of claim 1, wherein the anode is made of a non-reactive material.

4. The electrolysis system of claim 1, wherein the housing includes an electrically insulating material.

5. The electrolysis system of claim 1, wherein the gas produced at the first cathode is diatomic hydrogen.

6. The electrolysis system of claim 1, wherein the collection pipe includes a housing including an electrically insulating material.

7. The electrolysis system of claim 6, wherein the cathode lines an interior wall of the collection pipe housing.

8. The electrolysis system of claim 1, wherein the electrolysis solution is an ocean.

9. The electrolysis system of claim 1, wherein the electrolysis system is included in an open electrochemical cell.

10. The electrolysis system of claim 1, wherein the electrolysis system is included in a closed electrochemical cell.

11. A method for electrolysis, the method comprising:
electrolyzing a water-based electrolysis solution to produce at least one of diatomic gaseous oxygen and oxide ions;
trapping the at least one of diatomic gaseous oxygen and oxide ions with an inverted cup, the trapped at least one of diatomic gaseous oxygen and oxide ions forming a shield around an anode, the anode disposed within the inverted cup; and
bridging, electrically, the shield, the anode, the electrolysis solution and a cathode.

12. The method of claim 11, wherein the anode is made of a non-reactive material.

13. The method of claim 11, wherein the cathode is made of a non-reactive material.

14. The method of claim 11, wherein the shield around the anode is an electrical bridge between the electrolysis solution and the anode.

15. The method of claim 11, wherein the water-based electrolysis solution is underground well water.

16. An anode support, for use in an electrolysis system, the anode support comprising: a housing, the housing including electrically insulating material; an inverted cup, the inverted cup being at least one of coupled to the housing or integral with the housing and the inverted cup positioned at an end of the housing; and an anode, made of a non-reactive material, the anode disposed on an end of the vertically-oriented anode support, the anode further on an interior wall of the inverted cup such that electrical contact with an electrolysis solution is made along a concave portion of the inverted cup, the inverted cup configured to trap at least one of diatomic oxygen and oxide ions decomposed from the electrolysis solution, the at least one of diatomic oxygen and oxide ions forming an oxygen shield around the anode.

17. The anode support of claim 16, wherein the oxygen shield around the anode is an electrical bridge between the anode and the electrolysis solution.

18. The anode support of claim 16, wherein the electrolysis solution is an ocean.

* * * * *